United States Patent [19]

Sojka et al.

[11] 4,390,993

[45] Jun. 28, 1983

[54] LASER ELECTRODE ASSEMBLY

[75] Inventors: Richard J. Sojka, San Lorenzo; Leonard W. Braverman, San Francisco; Steve Guch, Jr., Saratoga; David J. Clark, Atherton, all of Calif.

[73] Assignee: GTE Products Corporation, Stamford, Conn.

[21] Appl. No.: 264,367

[22] Filed: May 18, 1981

[51] Int. Cl.³ .............................................. H01S 3/097
[52] U.S. Cl. ...................................... 372/87; 313/318
[58] Field of Search ........................... 372/87; 313/318

[56] References Cited

U.S. PATENT DOCUMENTS 3,886,479  5/1975  Pearson .................................. 372/87
4,040,707  8/1977  Pisano ................................... 313/318
4,201,438  5/1980  Shea ...................................... 313/318

Primary Examiner—William L. Sikes
Assistant Examiner—Léon Scott, Jr.
Attorney, Agent, or Firm—John F. Lawler

[57] ABSTRACT

A laser electrode assembly comprises an elongated bar having a plurality of longitudinally spaced sockets and is removably secured to a carrier which is anchored to the laser base and has a like number of plugs resiliently press-fitted within the sockets, respectively. Each plug has opposed sides to which are fastened a plurality of outwardly curved resilient fingers extending parallel to the direction of insertion of the plugs into the sockets. Each socket has a width less than the overall width of the plug and finger combination so that the fingers resiliently frictionally engage the bar within each socket. The bar is readily removed from the carrier for maintenance and repair purposes by prying the former from the plugs without necessitating removal of screws or bolts and thereafter passing the bar through the window opening aligned with the discharge gap.

2 Claims, 5 Drawing Figures

U.S. Patent  Jun. 28, 1983  4,390,993
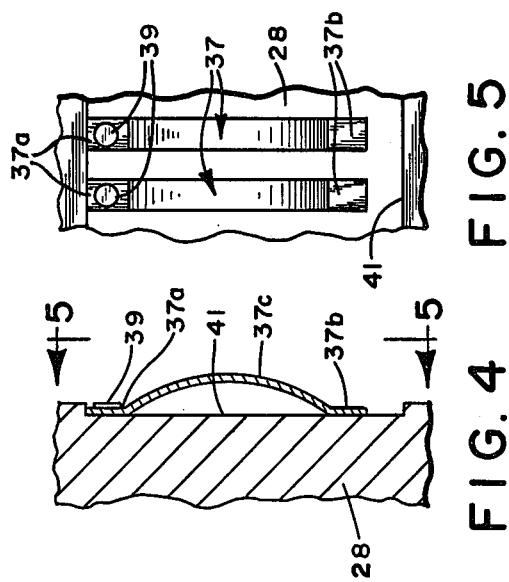
FIG. 5
FIG. 4
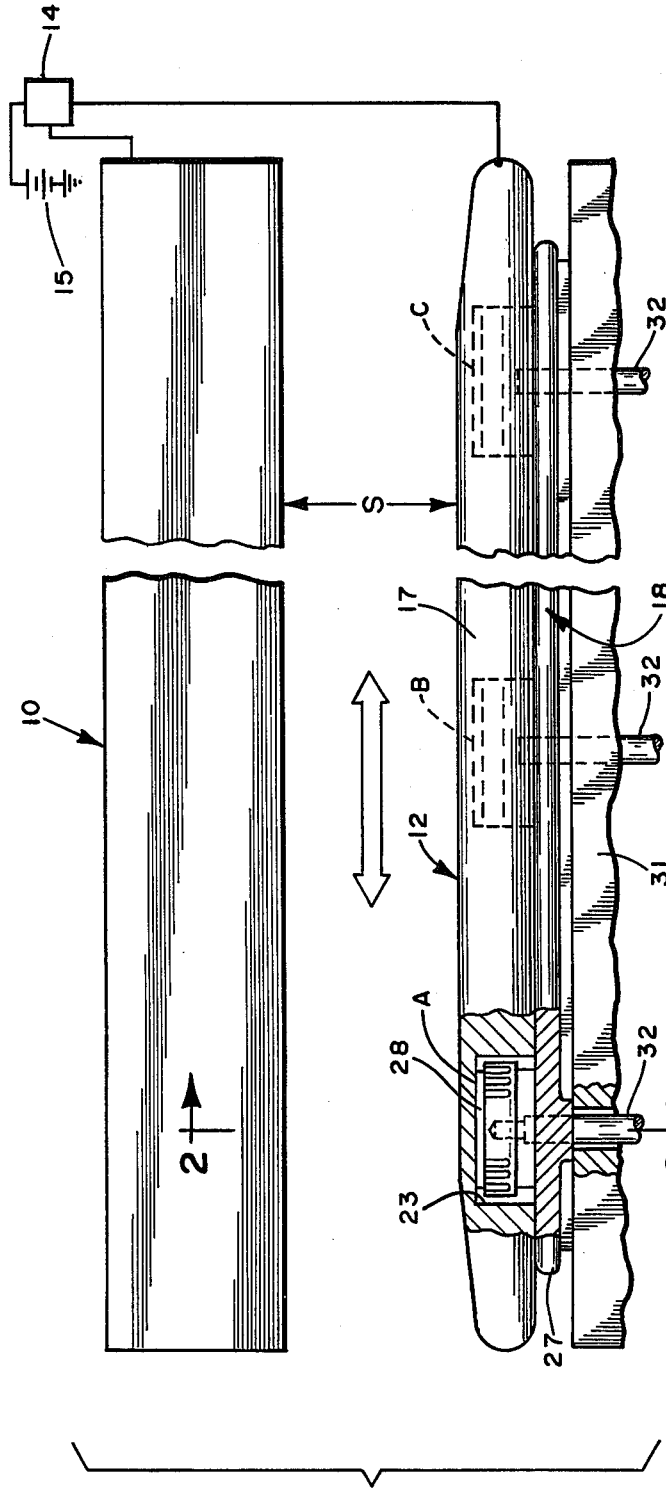
FIG. 1
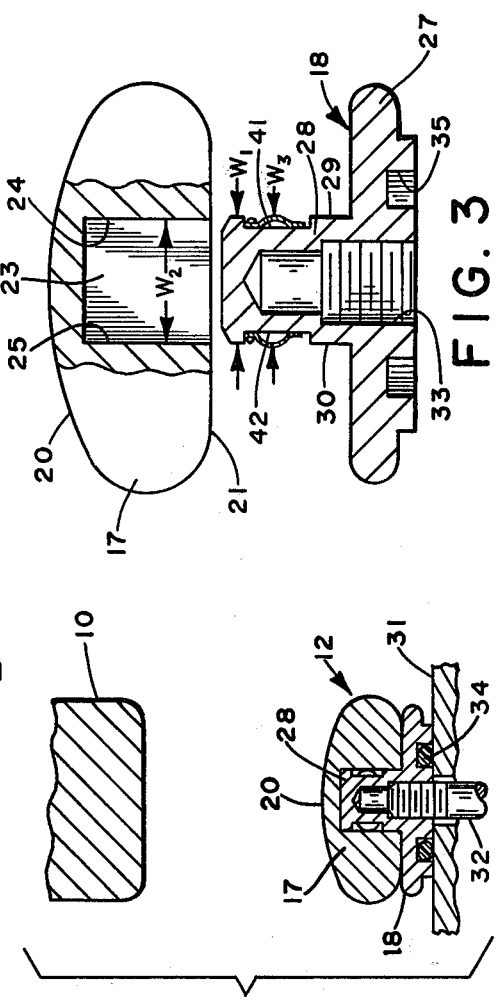
FIG. 3
FIG. 2

LASER ELECTRODE ASSEMBLY

BACKGROUND OF THE INVENTION

This invention was made under a contract with the Department of the Navy.

This invention relates to lasers and more particularly to an improved electrode assembly for a pulsed gas laser.

Maintenance or replacement of electrodes in a high-power pulsed gas laser is essential to ensure stable and efficient operation of the laser. Rapid installation and removal of the electrode to be maintained is therefore highly desirable to simplify maintenance and to minimize the down time of the laser. In the past electrodes typically have been fastened in place with screws which have served additionally as the primary areas of electrical contact. The disadvantage of screws is that they require considerable access space for both the tool (screw driver) and operator's hands. This means that (1) space must be allocated in the laser cavity for access thereby necessarily increasing the size of the laser for this purpose, (2) an access port be provided that exposes the entire length of the electrode, and/or (3) holding screws penetrate the shell of the laser. An example of a laser that illustrates the first of the above alternatives is described in U.S. Pat. No. 4,240,044. The more common alternatives (2) and (3) are illustrated in an article entitled "An Injection-Locked Unstable Resonator Rare-Gas Halide Discharge Laser of Narrow Linewidth and High Spatial Quality," *IEEE Journal of Quantum Electronics*, Vol. QE-16, No. 2, February 1980 (see FIG. 1, page 236 for electrode attachment).

All of the foregoing approaches to electrode replacement require a substantial amount of time to loosen and tighten screws. Moreover, the third alternative necessitates repeated breaking of seals thereby increasing the likelihood of leaks and further adversely affecting serviceability. The second alternative requires a long opening in the laser shell inasmuch as the electrodes are long (e.g., 20" or more) resulting in diminution of structural rigidity and strength of the laser shell which is an especially critical problem in pressurized lasers. Also, larger openings generally are more difficult to seal than the smaller ones.

This invention is directed to an improved electrode construction which overcomes the disadvantages mentioned above.

OBJECTS AND SUMMARY OF THE INVENTION

A general object of the invention is the provision of a laser electrode construction which simplifies installation and removal of the electrode.

Another object is the provision of an electrode construction which permits rapid installation and removal of the electrode, thereby minimizing the down time of the laser during maintenance operations.

These and other objects of the invention are achieved with an electrode having an elongated bar detachably connected to an anchored carrier at longitudinally spaced intervals by plugs on the carrier resiliently press-fitted into corresponding sockets in the bar.

DESCRIPTION OF THE DRAWINGS

FIG. 1 is a fragmentary elevational view, partly in section, of laser electrodes, one of which embodies this invention.

FIG. 2 is a view taken on line 2—2 of FIG. 1.

FIG. 3 is an enlarged exploded view of part of the lower electrode of FIG. 2.

FIG. 4 is a greatly enlarged part of the carrier in FIG. 3 showing details of one of the spring fingers.

FIG. 5 is a side elevation of part of the carrier as viewed on line 5—5 of FIG. 4.

DESCRIPTION OF PREFERRED EMBODIMENT

Referring now to the drawings, FIGS. 1 and 2 illustrate electrodes of a pulsed gas laser comprising a first elongated electrode 10 and a second electrode 12 coextensive with the first electrode and spaced therefrom by a distance S to define the laser discharge gap. Energy is supplied to these electrodes from a pulse forming network 14 connected to an external high voltage power supply 15. By way of example, second electrode 10 may comprise the cathode and electrode 12 the anode of the laser system. The electrical discharge between electrodes 10 and 12 causes the gas in the system to lase producing a laser beam to resonate in the laser cavity, not shown, in the direction of the arrow.

In accordance with this invention, electrode 12 is an assembly comprises an elongated bar 17 and a substantially coextensive carrier 18 connected together at a plurality of longitudinally spaced locations, three of which are indicated at A, B and C on the drawings. By way of example, an electrode 12 having a length of 50" was constructed with 18 of such connections, preferably equally spaced, between bar 17 and carrier 18. Bar 17 is a solid member made of aluminum or the like having a contoured upper surface 20 and a flat lower surface 21 and formed with a plurality of sockets 23 equal in number to the bar-carrier connections and opening at lower surface 21. Sockets 23 preferably have flat parallel sides 24 and 25 as shown in FIG. 3 but may also have other configurations.

Carrier 18 comprises an elongated plate-like member 27 slightly shorter than bar 17 and having a plurality of upwardly extending plugs 28 at longitudinally and equally spaced intervals. The number and spacing of plugs 28 are equal to the number and spacing of sockets 23 in bar 17. The shape of each plug 28 is such that it telescopes into the associated socket 23 during assembly of the electrode, the plug having opposed generally parallel sides 29 and 30 adjacent to sides 24 and 25, respectively, of the socket after assembly.

Carrier 18 is secured to a fixed base 31 by bolts 32 which threadedly engage tapped holes 33 formed in member 27 and in the lower parts of plugs 28, respectively. Member 27 is sealed against base 31 adjacent each bolt 32 by means of an O-ring 34 in a circular groove 35 formed in member 27 coaxially of each tapped hole 33. Carrier 18 is thus tightly secured throughout its length to base 31 and remains fixed in place when the electrode is removed.

The width $W_1$ of each plug 28 is slightly less than the width $W_2$ of each socket 23 measured between sides 24 and 25 thereof. Similarly the longitudinal dimension of each plug is slightly less than the corresponding socket dimension. In order to provide a tight connection between each carrier plug and the corresponding bar socket, a plurality of outwardly bowed substantially identical spring strips or fingers 37 preferably made of berylium copper are secured to opposite sides 29 and 30 of the plug. Each finger preferably has flat end portions 37a and 37b (see FIGS. 4 and 5) and an intermediate outwardly curved center portion 37c. The upper (as viewed) end portion 37a of each finger is secured by a weld 39 to the body of the plug while the lower finger portion 37b is unattached. The bowed center portion 37c extends outwardly from the plug sufficiently so that the plug width $W_3$ measured at the bowed center parts 37c of the fingers is larger than the width $W_2$ of sockets 23. In order to prevent interference between the tops of fingers 37 and the edges of sockets 23, recesses 41 and 42 are formed in plug sides 29 and 30 to receive the fingers.

Assembly of bar 17 and carrier 18 is achieved simply by alignment of sockets 23 with plugs 28 and forcing the bar downwardly over the plugs against fingers 37 on the plugs. In one embodiment of the invention a plug having 38 fingers on each side gave satisfactory results. Fingers 37 are sufficiently stiff to provide a tight but releasable engagement between bar 17 and carrier 18, the friction of the fit being sufficient to even remove any curvature of bar 17 throughout its length. Bar 17 is forced into place by hammering or pressing or the like and is pryed off for removal and servicing or replacement. In addition to providing a mechanical connection between the parts, fingers 17 also ensure positive electrical contact between these parts, the number and stiffness of fingers 37 utilized on each plug being a measure of the efficiency of this connection. By employing several such connections throughout the length of the electrode assembly, structural rigidity of the assembly is achieved.

When servicing is required, the laser is de-energized and bar 17 is pryed from the plugs 28 on the carrier and may be removed through the opening in the laser housing on which the output optical window is mounted.

What is claimed is:

1. An electrode assembly for a laser, said laser having a base, said assembly comprising
    first and second elongated coextensive electrodes spaced apart to define a discharge gap,
    said first electrode comprising an elongated carrier fastened to said base and a bar adjacent to and coextensive with said carrier on the side thereof opposite from said base, said bar having one side facing said second electrode and having a plurality of longitudinally spaced and aligned sockets on the opposite side thereof,
    said carrier having a like number of longitudinally spaced and aligned plugs projecting therefrom toward said second electrode adapted to be removably insertable in said sockets, respectively,
    each of said plugs having spring fingers secured thereto and engageable with said bar within the associated socket for releasably connecting said bar to said carrier.

2. An electrode assembly for a laser, said laser having a base, said assembly comprising
    first and second elongated coextensive electrodes spaced apart to define a discharge gap,
    said first electrode comprising an elongated carrier fastened to said base and a bar adjacent to and coextensive with said carrier on the side thereof opposite from said base, said bar having one side facing said second electrode and having a plurality of longitudinally spaced and aligned sockets on the opposite side thereof,
    said carrier having a like number of longitudinally spaced and aligned plugs projecting therefrom toward said second electrode,
    each of said plugs having a transverse dimension less than the corresponding dimension of the socket whereby to be removably insertable in the socket,
    each of said sockets and each of said plugs have opposed parallel sides,
    each side of each of said plugs having a plurality of parallel spring fingers extending in the direction of insertion of the plug into the socket and bowed outwardly from the plug by a distance greater than the difference of said dimensions of the plug and socket for releasably engaging said bar within the associated socket and thereby releasably connecting said bar to said carrier,
    each of said fingers having a flat end portion located proximate to the inner end of the socket and permanently connected to said plug.

* * * * *